Jan 6, 1931.  C. E. HOOVER  1,787,906
BATTERY TERMINAL CONNECTER UNIT
Filed Sept. 17, 1929
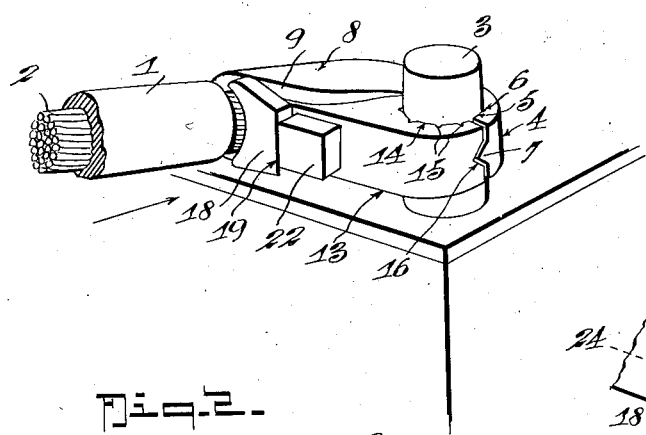
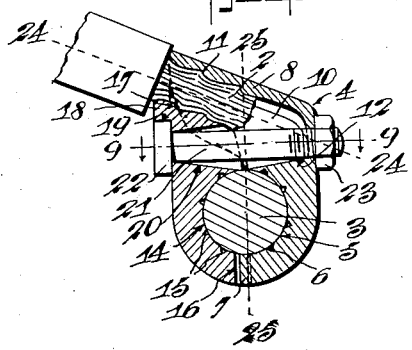
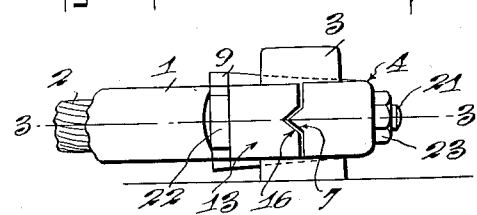
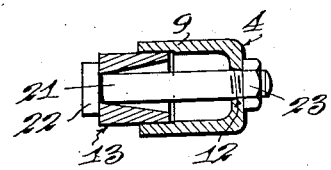
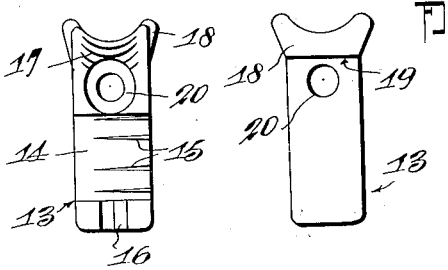
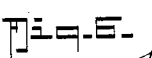
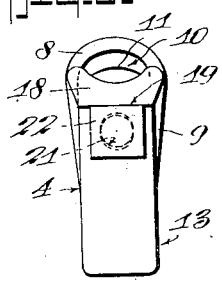
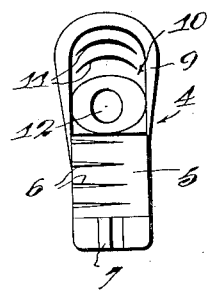
INVENTOR
Charles E. Hoover.
BY
ATTORNEY Patented Jan. 6, 1931

1,787,906

UNITED STATES PATENT OFFICE

CHARLES E. HOOVER, OF LANCASTER, PENNSYLVANIA

BATTERY-TERMINAL CONNECTER UNIT

Application filed September 17, 1929. Serial No. 393,283.

The invention relates to devices for effecting connection between an electric cable and a battery terminal. It particularly has for an object to provide an improved quickly attachable and detachable, non-solder repair unit which may be used effectively in substitution for the usual battery terminal connecter which is fastened to the end of the cable.

Further, it is an object of the invention to provide a connecter that will simultaneously grip both the battery cable and the battery post, using only one bolt and nut device for effecting the gripping and holding force.

Further, it is an object to provide a connecter which may be used as a temporary expedient or as a permanent repair or substitution as desired.

Further, it is an object to provide a connecter of the kind stated which has provisions for gripping the battery post throughout substantially its full circumference and will automatically accommodate itself to either straight or tapering posts.

It is also an object of the invention to provide a connecter between a cable and a battery post which is so designed and constructed as to enclose the live end of the cable which it grips in a socket formed between inter-projecting and cooperating portions of two opposed clamp members which also have opposed battery post gripping faces.

Further, it is an object to provide a connecter embodying the advantageous features above indicated, which may be economically manufactured of cast metal and, when necessary, enveloped in a non-corrosive metal, at low manufacturing cost.

Further, it is an object of the invention to provide a connecter embodying the advantageous features above indicated which also has provision for applying a clamping stress to the cable in such direction as to tend to draw the cable into the connecter during the application of clamping pressure.

Other objects will in part be obvious and in part be pointed out hereinafter.

To the attainment of the aforesaid objects and ends, my invention consists in the novel features of construction and in the combination, connection and arrangement of parts, hereinafter more fully described, and then pointed out in the appended claims.

In the drawing:

Figure 1 is a perspective view showing my invention in use.

Figure 2 is an elevation of the same.

Figure 3 is a horizontal section on the line 3—3 of Figure 2.

Figure 4 is an inner face view of the inner jaw.

Figure 5 is an outer elevation of the inner jaw.

Figure 6 is an elevation of the connecter looking in the direction of the arrow in Figure 1, the cable being omitted.

Figure 7 is an inner face view of the outer jaw.

Figure 8 is an outer elevation of the outer jaw.

Figure 9 is a detail section on the line 9—9 of Figure 3, looking down.

In the drawing, in which like numerals of reference indicate like parts in all of the figures, 1 represents the battery cable while 2 indicates the live portion stripped of insulation and 3 designates the battery post.

The connecter which comprises my present invention is composed of an outer clamp member 4, an inner clamp member 13 and a bolt and nut 21—22.

The outer clamp member 4 is provided with a battery post gripping face 5 that may be grooved as at 6 to afford a better hold on the battery post. At the end of the member 4 adjacent the battery post gripping face it is provided with a tongue 7, the purpose of which will clearly appear.

At the end opposite that having the battery post gripping face 5 the outer clamp member is provided with a cable gripping end 8 that is hooded at 9 and contains a tapered chamber 10, the outer wall of which is stepped or serrated as at 11 to afford a good grip on the cable.

A tapered bolt hole 12 is provided in the clamp member 4 between its two clamping ends, the smaller end of the bolt hole being at the outside of the member.

The inner clamping member 13 is provided with a battery post gripping face 14 corresponding to and supplementing the face 4. The gripping face 14 may also be provided with grooves 15 and the end of the member 13 which opposes the tongued end of the member 4 is provided with a groove 16 to receive the tongue 7. This tongue and groove connection 7—16 is such that the members may rock laterally but will be maintained in alignment with one another when the bolt is in place.

The inner clamp member 13 has its other end provided with a cable gripping face 17 and it projects into the hooded part 9 of the outer clamp member. It is also provided with a collar-lug 18 forming a square shoulder 19 against which the bolt head 22 rests to prevent turning, the collar-lug 18 partially embracing the live portion 2 of the cable at the outer end of the cable socket formed in the hooded part of the member 4 between the faces 8 and 17. The bolt 21 is provided with a nut 23 by means of which the two clamp members may be drawn together. A bolt hole 20 is also provided.

In applying the unit the same is placed on the battery post and the end 2 of the cable is inserted in the socket provided therefor. The nut 23 is then screwed tight. The tongue and groove engagement 7—16 forms a point of fulcrum at the beginning of the clamping action and the drawing together of the two clamp members by the bolt and nut device thus causes, by virtue of the inclination of the socket for the cable, the inner jaw member to move its clamping face 17 somewhat longitudinally of the cable, thereby tending to pull the cable toward and into the socket provided therefor and at the same time exerting the necessary clamping pressure securely to hold the cable in place and to hold the clamp members tightly on the battery post.

By providing the hooded part 9, i. e., by allowing the inner clamp member to enter the outer clamp member's hood, there will be in effect produced an inter-engagement which, when the bolt is in place, will prevent, or will cooperate with the tongue or groove connection 7—16 to prevent, the two clamp members getting out of longitudinal alignment. When both the tongue and groove connection 7—16 and the overlapping connection at the hood end of the clamp members are embodied in the connecter, the two clamp members are held against lateral displacement and maintained in alignment without side thrusts on the bolt. When the bolt is drawn tight no longitudinal movement of the jaws with respect to one another, which would tend to cut the bolt, will take place because of the fact that the clamp members engage the battery post terminal at their middle and adjacent to the axis of the bolt as well as engaging the battery post terminal at a diametrically opposite point. Any slight unevenness in the casting or slight misalignment of the battery post gripping faces will be taken up by virtue of the tapered bolt holes 12 and 20 without shearing strains on the bolt being applied when the device is under tension.

Other objects of the invention will be apparent to those skilled in the art and from the foregoing description taken in connection with the accompanying drawing, it is thought that the construction, operation and advantages of the invention will be clear to those skilled in the art to which it appertains.

It will be further understood that slight changes in the form, proportion and details of the invention may readily be made without departing from the spirit thereof or the scope of the appended claims.

It is to be noted that the axis, designated by the dotted line 24—24, of the cable socket lies in a plane normal to the axis of the battery post 3 and is inclined to a plane designated by the dotted line 25—25 which includes the axis of the post 3 and intersects the axis 24. By reason of this construction the gripping faces 11 and 17 have a relative longitudinal movement which, as before stated, tends to draw the cable into the socket as the parts are being placed under clamping stresses when tightening the nut 23.

What I claim is:

1. A battery cable to post connecter comprising opposed clamp members each having co-operating post gripping faces at one end and cable gripping faces at the other end, and each having an intermediate bolt hole, a bolt with nut passed through said holes for applying clamping pressures, and means to maintain said clamp members when assembled against getting out of alignment.

2. A battery cable to post connecter comprising opposed clamp members each having co-operating post gripping faces at one end and cable gripping faces at the other end, and each having an intermediate bolt hole, a bolt with nut passed through said holes for applying clamping pressures, and means to maintain said clamp members when assembled against getting out of alignment, said means including a longitudinally disposed tongue and groove engagement between said members.

3. A battery cable to post connecter comprising opposed clamp members each having cooperating post gripping faces at one end and cable gripping faces at the other end, each having an intermediate bolt hole, a bolt with nut passed through said holes for applying clamping pressures, and means to maintain said clamp members when assembled against getting out of alignment, said means including a longitudinally disposed tongue and groove engagement between said members at the ends thereof remote from the cable gripping faces.

4. A battery cable to post connecter comprising opposed clamp members each having cooperating post gripping faces at one end and cable gripping faces at the other end, and each having an intermediate bolt hole, a bolt with nut passed through said holes for applying clamping pressures, and means to maintain said clamp members when assembled against getting out of alignment, said means including a male and female engagement between said members at the ends for the cable gripping faces.

5. A battery cable to post connecter comprising opposed clamp members each having cooperating post gripping faces at one end and cable gripping faces at the other end, and each having an intermediate bolt hole, a bolt with nut passed through said holes for applying clamping pressures, means to maintain said clamp members when assembled against getting out of alignment, said means including a male and female engagement between said members at the ends for the cable gripping faces, and a longitudinally disposed tongue and groove engagement between said members at the ends thereof remote from the cable gripping faces.

6. A battery cable to post connecter comprising opposed clamp members each having cooperating post gripping faces at one end and cable gripping faces at the other end, and each having an intermediate bolt hole, a bolt with nut passed through said holes for applying clamping pressures, the axis of the cable gripping portion of the device lying in a plane at right angles to the axis of the post gripping portion and also lying at an acute angle to the axis of the bolt.

7. A battery cable to post connecter comprising opposed clamp members each having cooperating post gripping faces at one end and cable gripping faces at the other end, and each having an intermediate bolt hole, a bolt with nut passed through said holes for applying clamping pressures, the end of one of said clamp members which is remote from the cable gripping faces having a longitudinally disposed tongue and the corresponding end of the other of said clamp members having a longitudinal groove to receive said tongue.

8. A battery cable to post connecter comprising opposed clamp members each having cooperating post gripping faces at one end and cable gripping faces at the other end, and each having an intermediate bolt hole, a bolt with nut passed through said holes for applying clamping pressures, one of said clamp members being hooded adjacent the cable gripping portion to project over and receive the cable gripping end of the other of said clamp members.

9. A battery cable to post connecter comprising opposed clamp members each having cooperating post gripping faces at one end and cable gripping faces at the other end, and each having an intermediate bolt hole, a bolt with nut passed through said holes for applying clamping pressures, one of said clamp members being hooded adjacent the cable gripping portion to project over and receive the cable gripping end of the other of said clamp members, said other clamp member having a collar-lug to engage the cable and constitute a shoulder for the bolt head.

10. A battery cable to post connecter comprising opposed clamp members each having cooperating post gripping faces at one end and cable gripping faces at the other end, and each having an intermediate bolt hole, a bolt with nut passed through said holes for applying clamping pressures, the end of one of said clamp members which is remote from the cable gripping faces having a longitudinally disposed tongue and the corresponding end of the other of said clamp members having a longitudinal groove to receive said tongue, one of said clamp members being hooded adjacent the cable gripping portion to project over and receive the cable gripping end of the other of said clamp members.

11. A battery cable to post connecter comprising opposed clamp members each having cooperating post gripping faces at one end and cable gripping faces at the other end, and each having an intermediate bolt hole, a bolt with nut passed through said holes for applying clamping pressures, the end of one of said clamp members which is remote from the cable gripping faces having a longitudinally disposed tongue and the corresponding end of the other of said clamp members having a longitudinal groove to receive said tongue, one of said clamp members being hooded adjacent the cable gripping portion to project over and receive the cable gripping end of the other of said clamp members, said other clamp member having a collar-lug to engage the cable and constitute a shoulder for the bolt head.

12. A battery cable to post connecter comprising opposed clamp members each having cooperating post gripping faces at one end and cable gripping faces at the other end, and each having an intermediate bolt hole, a bolt with nut passed through said holes for applying clamping pressures, and means to maintain said clamp members when assembled against getting out of alignment, the said bolt holes being tapered with their ends of lesser diameter at the outer extremities.

CHARLES E. HOOVER.